Oct. 20, 1959   L. J. HESLIN ET AL   2,909,374
COLLET INDEXING DEVICE
Filed Jan. 23, 1956
Fig. 1
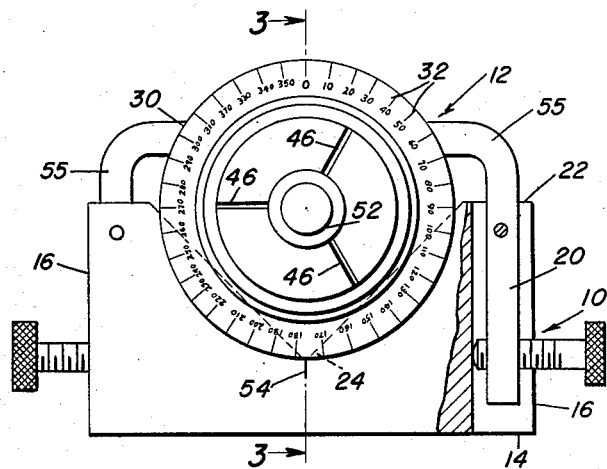
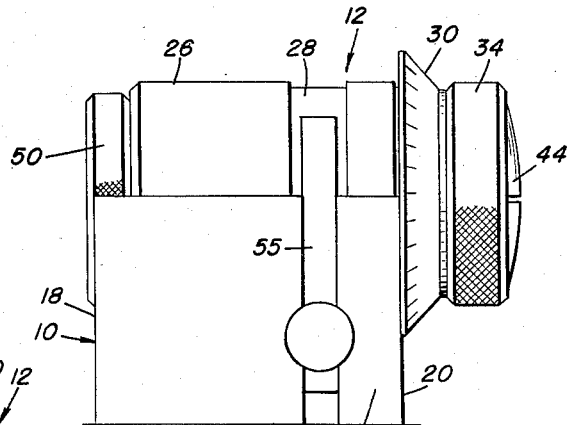
Fig. 3
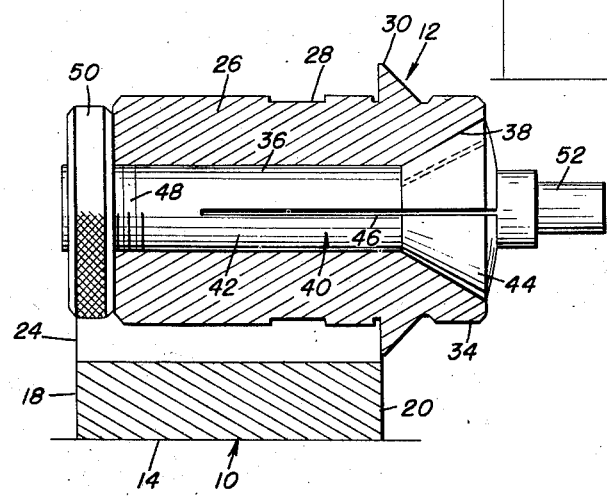
Fig. 2
Lawrence J. Heslin
Edward W. McLaren
INVENTORS
BY
Attorneys

United States Patent Office 2,909,374
Patented Oct. 20, 1959

2,909,374

COLLET INDEXING DEVICE

Lawrence J. Heslin and Edward W. McLaren, Danbury, Conn.

Application January 23, 1956, Serial No. 560,763

1 Claim. (Cl. 279—5)

This invention relates in general to new and useful improvements in work holders, and more specifically to an improved collet assembly having means for indexing the same.

The primary object of this invention is to provide an improved collet assembly which includes a suitable dial mounted on the sleeve or body member of the collet assembly which may be associated with any desired reference point for indexing work carried by the collet.

Another object of this invention is to provide an improved collet assembly which includes a sleeve or body member having received therein a collet equipped with a draw nut for moving the collet to a work clamping position, the sleeve being provided adjacent one end thereof with a relatively large dial which may be associated with any desired reference point for indexing the collet, the sleeve being provided adjacent the dial with a grip portion to facilitate turning of the collet assembly for indexing the work carried by the collet.

A further object of this invention is to provide an improved collet indexing device which includes a mounting block of the V-block type on which there is mounted the sleeve or body member of a collet assembly, the V-block being provided at one end thereof with a reference mark and the sleeve of the collet assembly being provided with a large dial adjacent one end of the block and associated with the reference mark for indexing work carried by the collet.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is an end view of the collet indexing device which is the subject of this invention and shows the relationship between the collet assembly and a mounting block including the dial carried by the collet assembly and the reference mark on the mounting block;

Figure 2 is a side elevational view of the collet assembly and mounting block of Figure 1 and shows further the details thereof; and Figure 3 is a longitudinal vertical sectional view taken substantially upon the plane indicated by the section line 3—3 of Figure 1 and shows the specific details of both the collet assembly and the mounting block.

Referring now to the drawings in detail, it will be seen that the present invention consists of a mounting block which is referred to in general by the reference numeral 10, and a collet assembly, which is referred to in general by the reference numeral 12.

The mounting block 10 is of the V-block type and includes a bottom wall 14, side walls 16, end walls 18 and 20 and a top wall 22. Formed in the top wall 22 is a centrally disposed V-groove 24 which is referred to by the reference numeral 24. A major portion of the collet assembly 12 is seated in the V-groove 24.

As is best illustrated in Figure 3, the collet assembly 12 includes an elongated sleeve or tubular body member 26. The exterior surface of the sleeve 26 is provided with an annular recess 28 whose purpose will be set forth in detail hereinafter. Also carried by the sleeve 26 adjacent one end thereof is an outwardly projecting, annular dial 30 having suitable indicia 32 (best shown in Figure 1) formed thereon for indicating the various angles of a circle. The extreme end portion of the sleeve 26 adjacent the dial 30 is knurled to form a grip portion 34.

The sleeve 26 is provided with a bore 36 therethrough which opens at the end of the sleeve 26 having the grip portion 34 into a flared portion 38. Positioned within the bore 36 and the flared portion 38 is a collet which is referred to in general by the reference numeral 40.

The collet 40 includes an elongated barrel portion 42 which is received in the bore 36 and a frusto-conical head 44 which is received in the flared portion 38 and engages the surface thereof. The collet 40 is longitudinally split as at 46 and is of the spring type. The end of the barrel portion 42 remote from the head 44 is externally threaded as at 48 and is provided with a rotatable jaw nut 50 for pulling the collet 40 through the sleeve 26 and effecting the clamping of the work piece, such as the work piece 52 within the collet 40. It is understood that for the purpose of the present invention, any type of collet may be utilized in the sleeve 26.

In order that the collet assembly 12 may be restrained against longitudinal shifting with respect to the mounting block 10, the mounting block 10 is provided with suitable fingers 55 which will engage in the groove 28 to prevent the movement of the sleeve 26. The fingers 55 are of the type disclosed in the patent to Brown, Patent No. 1,923,967, issued August 22, 1933.

The end wall 20 is provided with a reference mark 54 to which the work 52 may be referenced with indexing the collet assembly with the dial 30. It is to be noted that the center of the collet assembly 12 is aligned with the top wall 22 of the mounting block 10. Accordingly, this also may be utilized as a reference mark. The advantages and many uses of the invention will be appreciated by a machinist and others utilizing collets of this type.

Although the term "mounting block" has been used to describe the mounting member or block 10, for the purposes of the present invention the term is not intended to be so limited. The term "mounting block" is intended to include all types of mounting members, including mounting blocks, mounting brackets of all types, vises, hollow spindles, etc. in which the sleeve 26 may be mounted for rotation.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A collet indexing device comprising a mounting block, said mounting block including an upper indexing surface and being provided with a seat generally V-shaped in cross section, a collet assembly carried by said mounting block for rotation, said collet assembly including a body member, said body member being seated on said seat and supported thereby for rotation, a dial on said body member disposed in partial overlying relation to one end of said mounting block, pointer means on said one end cooperating with said dial to facilitate the positioning of said collet assembly, said body member having a grip portion disposed adjacent said dial and spaced from said mounting block to facilitate both the turning and holding of said body member, said body member being provided with an annular groove aligned with said mounting block for receiving fingers to prevent relative movement, other than rotary, between said collet assembly and said mounting block.

References Cited in the file of this patent

UNITED STATES PATENTS

| | | |
|---|---|---|
| 1,923,967 | Brown | Aug. 22, 1933 |
| 2,520,518 | Thompson | Aug. 29, 1950 |
| 2,668,719 | Harmon | Feb. 9, 1954 |